(12) United States Patent
Brenden et al.

(10) Patent No.: US 7,042,672 B2
(45) Date of Patent: May 9, 2006

(54) VELOCITY CONTROLLED DISK DRIVE HEAD RETRACTION WITH REDUCED AUDIBLE NOISE

(75) Inventors: Jason P. Brenden, Woodbury, MN (US); James A. Dahlberg, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/955,714

(22) Filed: Sep. 30, 2004

(65) Prior Publication Data
US 2006/0066981 A1    Mar. 30, 2006

(51) Int. Cl.
*G11B 21/02*    (2006.01)

(52) U.S. Cl. ....................................................... 360/75
(58) Field of Classification Search ...................... None
See application file for complete search history.

(56) References Cited

U.S. PATENT DOCUMENTS

| | | | |
|---|---|---|---|
| 6,040,671 A | 3/2000 | Brito et al. | |
| 6,072,666 A | 6/2000 | Sonderegger et al. | |
| 6,081,400 A * | 6/2000 | Lu et al. | 360/75 |
| 6,108,157 A | 8/2000 | Yoneda et al. | |
| 6,301,082 B1 | 10/2001 | Sonderegger et al. | |
| 6,324,033 B1 | 11/2001 | Broom et al. | |
| 6,353,510 B1 * | 3/2002 | Drouin | 360/75 |
| 6,396,652 B1 | 5/2002 | Kawachi et al. | |
| 6,512,650 B1 | 1/2003 | Tanner | |
| 6,594,102 B1 | 7/2003 | Kanda et al. | |
| 6,667,843 B1 | 12/2003 | Norman et al. | |
| 6,721,119 B1 | 4/2004 | Hassan et al. | |
| 6,765,746 B1 | 7/2004 | Kusumoto | |
| 2001/0019463 A1 * | 9/2001 | Drouin | 360/75 |

* cited by examiner

Primary Examiner—K. Wong
(74) Attorney, Agent, or Firm—Kinney & Lange, P.A.

(57) ABSTRACT

A control circuit controls current through a voice coil motor (VCM) during retraction of a transducing head from the surface of a recordable medium. The transducing head is carried on movable member actuated by the VCM. The control circuit includes a measuring circuit for measuring a back electromotive force (back EMF) from the VCM. The control circuit also includes a driver circuit connected to terminals of the VCM for providing the VCM with a drive current having a magnitude based on the back EMF from the VCM. The control circuit further includes a chop clock to alternate between measuring the back EMF from the VCM and providing the VCM with the drive current at a random frequency within a range of frequencies around a median frequency.

25 Claims, 3 Drawing Sheets

VELOCITY CONTROLLED DISK DRIVE HEAD RETRACTION WITH REDUCED AUDIBLE NOISE

BACKGROUND OF THE INVENTION

The present invention relates to disk drives and storage devices. In particular, the present invention relates to reducing undesirable audible noise in velocity controlled hard disk drive head/arm assemblies during head retraction.

Generally, a magnetic hard disk drive (HDD) includes a magnetic read/write head and several magnetic disks, each disk having concentric data tracks for storing data. The disks are mounted on a spindle motor, which causes the disks to spin. The read/write head is typically mounted on a slider, which is mounted to a suspension or load beam. The load beam is attached to an actuator arm of an actuator, which moves the read/write head over the spinning disk during operation. As the disks spin, the slider suspended from the actuator arm "flies" a small distance above the disk surface. The slider carries a transducing head for reading from or writing to a data track on the disk.

In addition to the actuator arm, the slider suspension comprises a bearing about which the actuator arm pivots. A large scale actuator motor, such as a voice coil motor (VCM), is used to move the actuator arm (and the slider) over the surface of the disk. When actuated by the VCM, the actuator arm can be moved from an inner diameter to an outer diameter of the disk along an arc until the slider is positioned above a desired data track on the disk.

A control circuit is coupled to a coil in the VCM in order to controllably supply current to the coil. When a current is passed through the coil, a motive force is exerted on the actuator arm. The actuator arm is subjected to a force tending to accelerate the actuator arm at a rate defined by the magnitude of the current, and in a direction defined by the polarity of the current. Thus, in order to accelerate or decelerate the actuator arm until it is moving at a desired velocity and in a desired direction, it is important to know the actual direction and velocity of the actuator arm. It is known that the back electromotive force (back EMF) from the coil of the actuator is representative of the velocity and direction of movement of the actuator arm.

Parking zones in an HDD allow the read/write head to be safely landed after the hard drive has ceased operation. When an HDD is powered down, it usually performs certain operations before actually disconnecting from the external power source. One of these power down operations is to operate the actuator arm to move the head to the parking zone. If the head is not moved to the parking zone prior to power down, the head will land on the disk after the disk stops spinning, potentially damaging the disk and the read/write head.

In many conventional systems, the drive voltage or current to the VCM is continuously enabled and disabled at a constant frequency in order to provide alternating driving of the VCM (enabled) and measuring of the actuator arm speed by the control circuitry (disabled). The frequency of the drive voltage or current in these systems is typically at a frequency within the audible range, thereby causing an undesirable constant tone during head retraction. One method of resolving this problem is to limit the magnitude of the drive to the VCM to keep the acoustic noise level to a minimum. However, by limiting the maximum drive to keep the acoustic level low, the speed of the retraction cannot be controlled as easily. This is especially true when the read/write head reaches the parking zone or when a retraction magnet accelerates the actuator arm.

Thus, there is a need for an actuator arm retract controller that reduces audible noise while still allowing velocity control of the actuator arm during retraction.

BRIEF SUMMARY OF THE INVENTION

The present invention is a control circuit for controlling current through a voice coil motor (VCM) during retraction of a transducing head from the surface of a recordable medium. The transducing head is carried on movable member actuated by the VCM. The control circuit includes a measuring circuit for measuring a back electromotive force (back EMF) from the VCM. The control circuit also includes a driver circuit connected to terminals of the VCM for providing the VCM with a drive current having a magnitude based on the back EMF from the VCM. The control circuit further includes switching circuitry to aperiodically and alternately enable the measuring circuit and the driver circuit.

In one embodiment, the switching circuitry comprises a random frequency generator including a control circuit clock input and a random clock offset input. The random clock offset input is preferably provided by a programmable register, such as a linear feedback shift register. The switching circuitry alternately enables the measuring circuit and the driver circuit at a random frequency within a range of frequencies around a median frequency.

DETAILED DESCRIPTION

Figure 1:
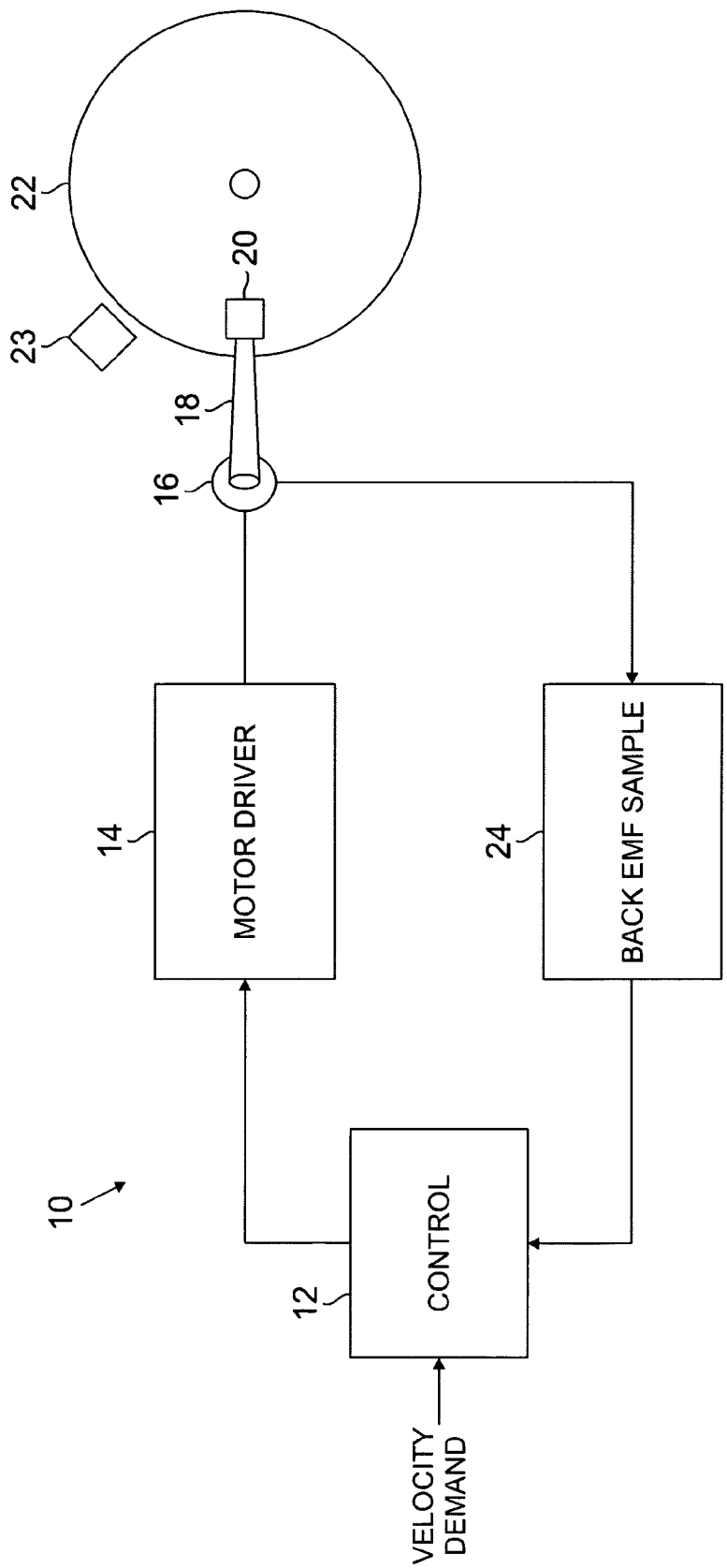
FIG. 1 is a block diagram of a typical velocity controlled disk drive head retraction control system.

FIG. 1 is a block diagram of typical velocity controlled disk drive head retraction control system 10. Disk drive head retraction control system 10 includes control block 12, motor driver block 14, motor 16, actuator arm 18, transducing head 20, disk 22, parking location 23, and back electromotive force (back EMF) sampling block 24. Control block 12 receives a velocity demand signal as an input and provides a control signal to motor driver block 14. Motor driver block 14 is connected to motor 16 and provides a drive current to motor 16 to move actuator arm 18. Back EMF sampling block 24 is connected to motor 16 to sample the back EMF from motor 16. Back EMF sampling block 24 provides a signal to control block 12.

In normal operation, a drive current is provided to motor 16 to actuate actuator arm 18. When actuated by motor 16, actuator arm 18 can be moved from an inner diameter to an outer diameter of disk 22 along an arc until transducing head 20 is positioned above a desired data track on disk 22. Disk 22 includes a plurality of concentric tracks on which data and position information is recorded. Disk 22 is mounted on a spindle motor, which causes disk 22 to spin. Transducing head 20 suspended from actuator arm 18 flies above the surface of disk 22 as it spins. Transducing head 20 is operable to read the data and position information from tracks of disk 22 and generate an input signal representative of the data and position information.

When a disk drive is powered down, it usually performs certain operations before actually disconnecting from the external power source. One of these power down operations is to operate actuator arm 18 to move transducing head 20 to parking location 23. Parking location 23 allows transducing head 20 to be safely landed after the disk drive has ceased operation. Parking location 23 is located at the outermost edge of disk 22 and typically includes a ramp to raise transducing head 20 and park it off of disk 22 in an elevated position. If the head is not moved to parking location 23 prior to power down, the head will land on disk 22 after disk 22 stops spinning, potentially damaging disk 22 and transducing head 20.

In the event of a catastrophic shut down (i.e., external power is suddenly removed), there is no external power to perform power down procedures, including moving transducing head 20 to parking location 23. Typically, the momentum of the spinning disk operates the spindle motor to generate a back electromotive force at the motor terminals, which is rectified and stored to provide power to disk drive head retraction control system 10 upon a catastrophic shut down. However, the power available to power motor 16 is limited by the spindle motor resistance and the back electromotive force of the spindle motor.

Disk drive head retraction control system 10 is a typical implementation of a system to retract transducing head 20 in a catastrophic power loss situation. Control system 10 alternately drives motor 16 with a drive current during a driving phase and measures the back EMF from the motor 16 during a measuring phase. The back EMF from motor 16 is representative of the velocity and direction of movement of actuator arm 18.

During the driving phase, control block 12 receives a velocity demand signal representing a preferred retraction velocity and direction of transducing head 20. The velocity demand signal is typically a programmable value stored in a register or other storage device. The torque load encountered by transducing head 20 as it traverses its path in a retract operation varies considerably with position. Consequently, control block 12 must constantly adjust the drive current to transducing head 20 to correspond to the velocity demand signal. Control block 12 provides a signal to motor driver block 14 corresponding to the drive current necessary to adjust the actual velocity of the transducing head 20 to correspond to the preferred velocity of the velocity demand signal. Motor driver block 14 amplifies this signal and drives motor 16 with a drive current to accelerate or decelerate retraction of transducing head 20 toward parking location 23.

During the measuring phase, the drive current to motor 16 is disabled. Subsequently, the back EMF from motor 16 is sampled by back EMF sample block 24. Preferably, the back EMF from motor 16 is sampled a plurality of times during the measuring phase and averaged to provide an average back EMF signal. The back EMF signal is then amplified by back EMF sample block 24 and passed to control block 12. This signal represents the actual velocity of transducing head 20. Control block 12 then uses the sampled back EMF signal to compare the actual velocity of transducing head 20 with the preferred velocity of the velocity demand signal. The driving phase then begins again as control block 12 provides a signal to motor driver block 14 corresponding to the drive current necessary to adjust the velocity of transducing head 20 to correspond to the preferred velocity of the velocity demand signal.

In many conventional systems, the drive voltage or current to motor 16 is continuously enabled and disabled at a constant frequency in order to alternately drive motor 16 (enabled) and measure the velocity of actuator arm 18 (disabled). The frequency of alternation between enabling and disabling of the drive voltage or current in these systems is typically at a frequency within the audible range (i.e., 20 Hz –20 kHz), thereby causing an undesirable constant tone during head retraction.

Figure 2:
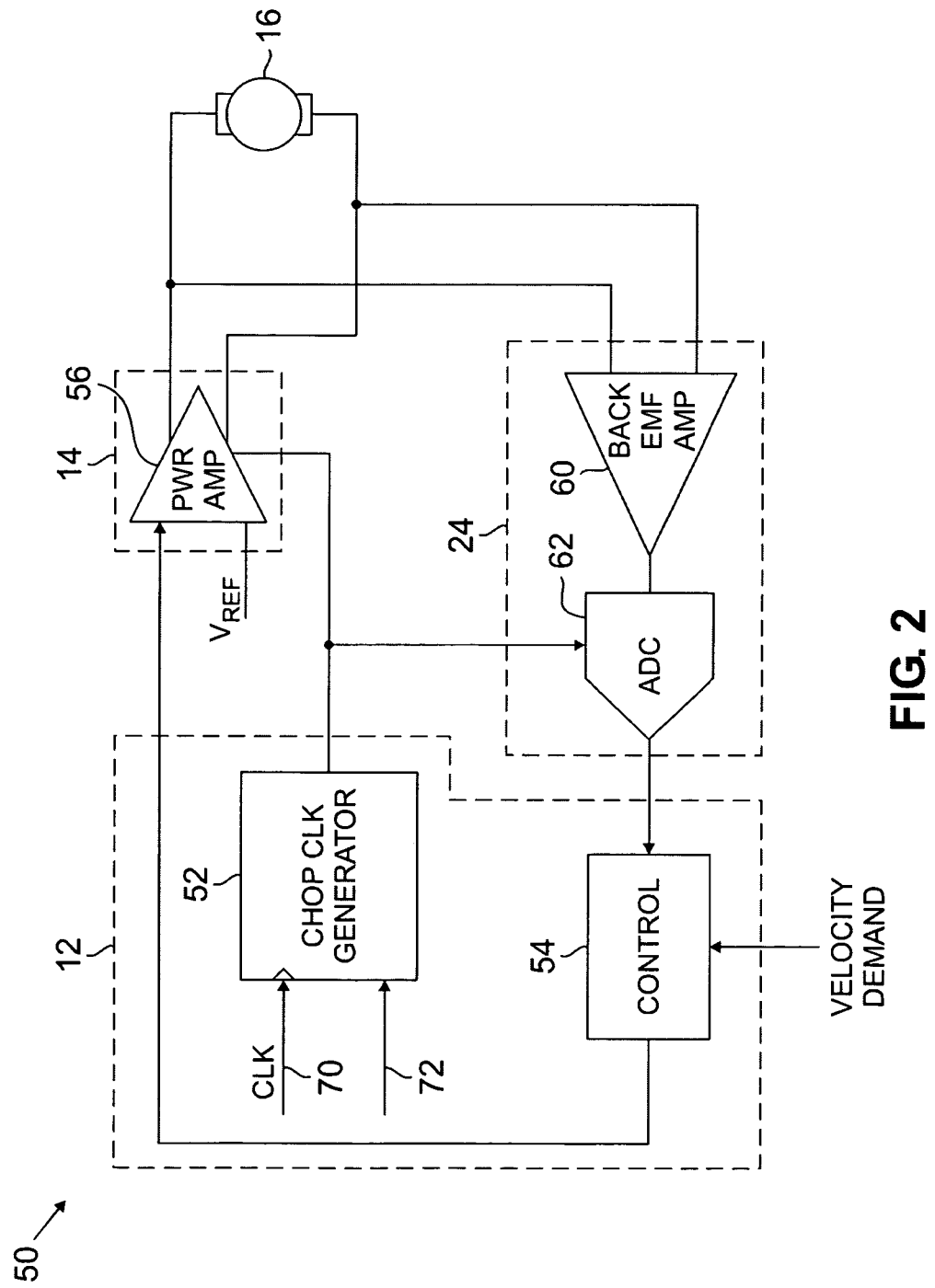
FIG. 2 is a schematic diagram of a velocity controlled disk drive head retraction control system with audible noise reduction according to the present invention.

FIG. 2 is a schematic diagram of velocity controlled disk drive head retraction control system 50 with audible noise reduction according to an embodiment of the present invention. Retraction control system 50 includes the same functional blocks as shown and described with regard to FIG. 1, including control block 12, motor driver block 14, motor 16, and back EMF sample block 24. Each of these blocks is shown in more detail in FIG. 2. Control block 12 includes chop clock generator circuit 52 and control circuit 54. Motor driver block 14 includes power amplifier circuit 56. One input of power amplifier circuit 56 is connected to an output of control circuit 54, while a second input of power amplifier circuit 56 is connected to a reference voltage $V_{Ref}$. The output of chop clock generator circuit 52 is connected to a tri-state input of power amplifier circuit 56. The outputs of power amplifier circuit 56 are connected across motor 16. Back EMF sample block 24 includes back EMF amplifier 60 and analog-to-digital converter (ADC) 62. The inputs of back EMF amplifier 60 are connected across motor 16, and the output of back EMF amplifier 60 is provided to the input of ADC 62. The output of ADC 62 is provided to control circuit 54.

In operation, retraction control system 50 alternates between a driving phase and a measuring phase to control retraction of transducing head 20. During the driving phase, control circuit 54 receives a velocity demand signal representing a preferred retraction velocity and direction. Control circuit 54 subsequently provides a signal to power amplifier circuit 56 corresponding to the drive current necessary to adjust the actual velocity of the transducing head to coincide with the preferred velocity of the velocity demand signal. Power amplifier circuit 56 amplifies this signal and drives motor 16 with a drive current to accelerate or decelerate retraction of the transducing head.

During the measuring phase, the drive current to motor 16 is disabled, and the back EMF from motor 16 is sampled and amplified by back EMF amplifier 60. In one embodiment, multiple back EMF measurements are taken and averaged during each measuring phase to improve the accuracy of the back EMF measurement. The analog back EMF signal is then passed to ADC 62 to produce a digital representation of the back EMF measurement. The digital back EMF measurement is then passed to control circuit 54. This signal represents the actual velocity of transducing head 20. Control circuit 54 then uses the sampled back EMF signal to compare the actual velocity of transducing head 20 with the preferred velocity of the velocity demand signal. In one embodiment, control circuit 54 includes a digital implementation of a proportional integral (PI) controller to perform this operation. The driving phase then begins again as control circuit 54 provides a signal to power amplifier 56 corresponding to the drive current necessary to adjust the velocity of transducing head 20 to coincide with the preferred velocity of the velocity demand signal.

Chop clock generator 52 controls alternating between the driving phase and the measuring phase in retraction control system 50. Chop clock generator 52 preferably produces a signal that comprises a rectangular wave. The output of chop clock generator 52 is connected to the tri-state input of power amplifier circuit 56 and to the enabling input of ADC 62. Power amplifier circuit 56 is enabled when its tri-state input is low and ADC 62 is enabled when its enabling input is high. Thus, when the output of chop clock generator 52 transitions to the low state of the rectangular wave, power amplifier circuit 56 is enabled, ADC 62 is disabled, and the driving phase commences. Conversely, when the output of chop clock generator 52 transitions to the high state of the rectangular wave, ADC 62 is enabled, power amplifier circuit 56 is disabled, and the measuring phase commences.

Chop clock generator 52 has two inputs, system clock 70 and nominal period 72. System clock 70 provides a recurring rectangular or square wave at a constant frequency to clock all circuit components of chop clock generator 52. System clock 70 is typically provided by an oscillator internal to retraction control system 50.

Nominal period 72 determines the median period of the output signal from chop clock generator 52. In one embodiment, nominal period 72 is provided by a programmable control register, such as a linear feedback shift register (LFSR). Chop clock generator 52 uses nominal period 72 to produce an aperiodic chop clock signal. As a result, retraction control system 50 is switched between the driving phase and the measuring phase at a random frequency within a range of frequencies around the median frequency. The random frequency of the chop clock signal is preferably in a range of frequencies within about 20 or 30 percent of the median frequency. When retraction control system 50 is switched between the driving phase and the measuring phase at a random frequency within this range of frequencies, the audible noise that typically occurs during retraction of the transducing head is significantly reduced. More specifically, in conventional head retraction systems, a constant audible tone is heard during head retraction after a catastrophic power loss since alternating between the driving phase and the measuring phase occurs at a constant frequency within the audible frequency range. In retraction system 50 according to the present invention, this alternating occurs at various frequencies that are spread out around the median frequency, thus eliminating the constant tone and reducing the overall audible noise during retraction of the transducing head.

Figure 3:
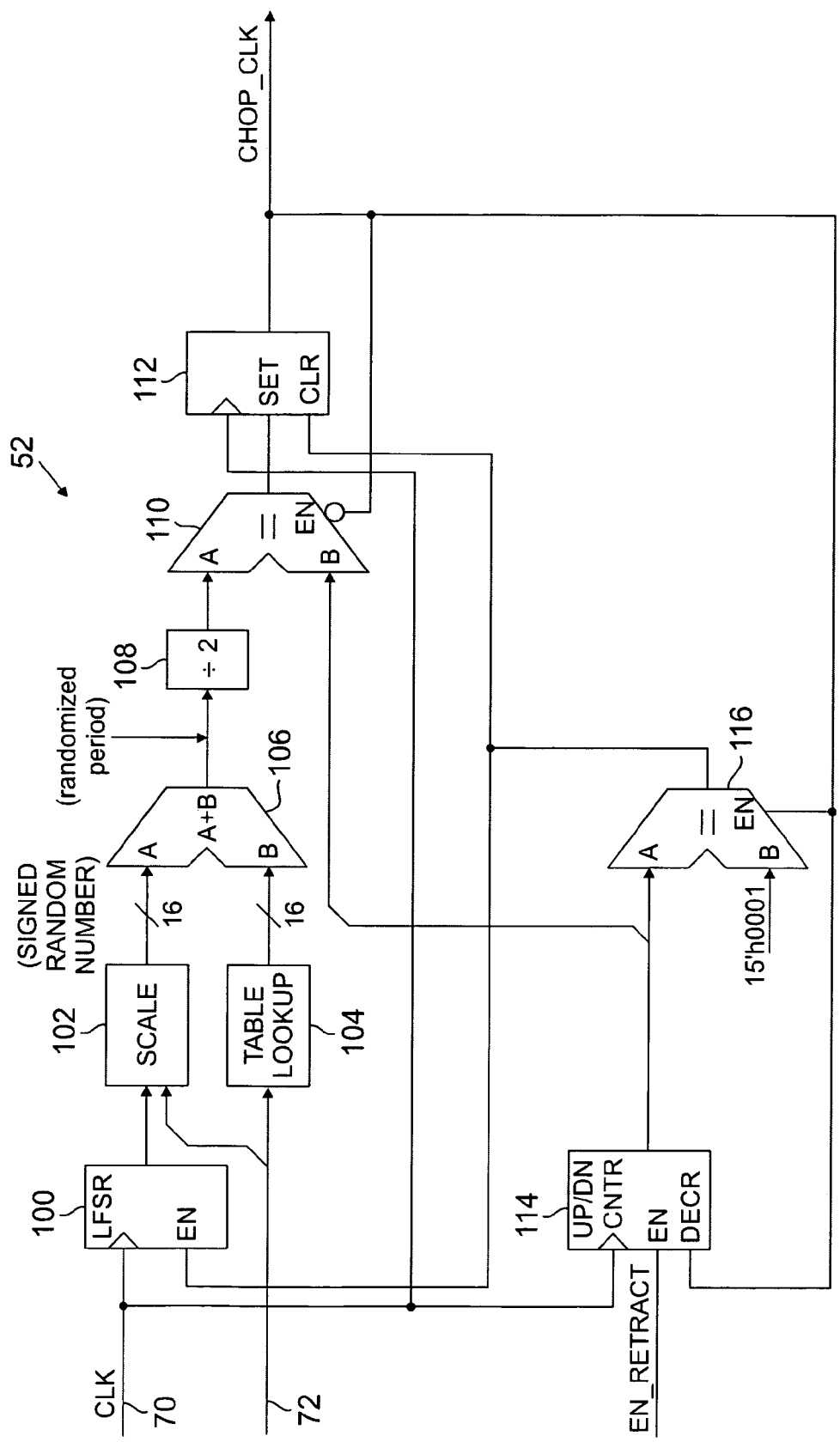
FIG. 3 is a schematic diagram of a chop clock generator according to an embodiment of the present invention.

FIG. 3 shows one embodiment of chop clock generator 52. It will be appreciated that chop clock generator 52 as described below is merely exemplary, and any device capable of producing a signal with a random frequency within a range of frequencies around a median frequency may be used in place of chop clock generator 52 without departing from the spirit and scope of the present invention.

Chop clock generator 52 includes random number generator 100, scaling block 102, table lookup block 104, adder 106, divider 108, comparator 110, flip flop 112, up/down counter 114, and comparator 116. Random number generator 100 receives system clock 70 and the output of comparator 116 as inputs and provides an output to an input of scaling block 102. Nominal period 72 is provided as an input to scaling block 102 and table lookup block 104. The outputs of scaling block 102 and table lookup 104 are provided to adder 106, and the output of adder 106 is provided to divider 108. Divider 108 supplies one input to comparator 110. Up/down counter 114 is clocked by system clock 70 and is activated by an enable retract signal (EN_RETRACT). The output of up/down counter 114 is provided to an input of comparator 110 and to an input of comparator 116. The output of comparator 116 is provided to the enabling input of random number generator 100 and the clear control input of flip flop 112. The set control input of flip flop 112 is provided by the output of comparator 110. The output of flip flop 112 provides the output of chop clock generator 52 (CHOP_CLK), which also provides the enabling input for comparators 110 and 116 and an input of up/down counter 114.

Nominal period 72 is provided by a 3-bit programmable control register in one embodiment. This 3-bit value is provided to scaling block 102 and table lookup 104. Table lookup 104 contains eight programmable 16-bit period values. Table lookup 104 is used to convert the 3-bit control register value of nominal period 72 to one of the eight 16-bit period values stored in table lookup 104. The 16-bit output of table lookup 104 is provided to adder 106.

Scaling block 102 uses the 3-bit value of nominal period 72 to scale the output of random number generator 100. The scale factors in scaling block 102 are chosen to randomize the frequency output of chop clock generator 52 in a range of frequencies within about 20 or 30 percent of the median frequency. In one embodiment, random number generator 100 is a linear feedback shift register (LFSR) that is updated once per chop clock cycle such that each chop clock period has high time and low time of equal lengths. The output of scaling block 102 is a 16-bit signed random number that is added to the output of table lookup 104 by adder 106. The output of adder 106 is a signal with a randomized period based on nominal period 72. This randomized period is divided by two by divider 108 and provided to comparator 110.

Up/down counter 114 is clocked by system clock 70 and provides an output to an input of comparator 110 that counts from zero up to a value equal to nominal period 72 plus the output of scaling block 102 divided by two (that is, the value provided to input A of comparator 110) and back down to zero at a rate defined by system clock 70. Up/down counter 114 begins counting when the retraction sequence is enabled by asserting the EN_RETRACT input of up/down counter 114. The output of comparator 110 provides the set control input of flip flop 112. When up/down counter 114 is counting up, the output of chop clock generator 52 is set high. Conversely, when up/down counter 114 is counting down, the output of chop clock generator 52 is set low. The output of chop clock generator 52 is provided to a decrementing control input of up/down counter 114 and the enabling input of comparator 116. The complement of the output from chop clock generator 52 is provided to the enabling input of comparator 110. Thus, when the output chop clock generator 52 is set high, the enabling input of comparator 116 is asserted and the enabling input of comparator 110 is de-asserted. Also, the decrementing control input of up/down counter 114 is asserted, which causes up/down counter 114 to begin counting down. This causes the output of chop clock generator 52 to switch to low, which asserts the enabling input of comparator 110, de-asserts the enabling input of comparator 116, and de-asserts the decrementing input of up/down counter 114. As a result, up/down counter 114 starts counting up, which causes the output of chop clock generator 52 to switch to high. The switching of the output of chop clock generator 52 between high and low occurs aperiodically at a frequency defined by the output signal of adder 106 (as described above).

In summary, in many conventional systems the drive voltage or current to the VCM is continuously enabled and disabled at a constant frequency in order to provide alternating driving of the VCM (enabled) and measuring the actuator arm speed by the control circuitry (disabled). The frequency of the drive voltage or current in these systems is typically at a frequency within the audible range, thereby causing an undesirable constant tone during head retraction. The present invention is a control circuit for controlling current through a voice coil motor (VCM) with reduced audible noise during retraction of a transducing head from the surface of a recordable medium. The transducing head is carried on a movable member actuated by the VCM. The control circuit includes a measuring circuit for measuring a back electromotive force (back EMF) from the VCM. The control circuit also includes a driver circuit connected to terminals of the VCM for providing the VCM with a drive current having a magnitude based on the back EMF from the VCM. The control circuit further includes switching circuitry to aperiodically and alternately enable the measuring circuit and the driver circuit.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logic gates and chips that could also be implemented by discrete devices, all within the scope and spirit of the present invention.

What is claimed is:

1. A control device for controlling current through a voice coil motor (VCM) during retraction of a transducing head from the surface of a recordable medium, the transducing head carried on a movable member actuated by the VCM, the control device comprising:
   a measuring circuit for determining an average back electromotive force (back EMF) from the VCM by measuring the back EMF a plurality of times and averaging the measured back EMF, wherein the average back EMF from the VCM is related to a velocity of the movable member;
   a driver circuit connected to the VCM for providing the VCM with a drive current having a magnitude based on the average back EMF from the VCM; and
   switching circuitry that aperiodically and alternately enables the measuring circuit and the driver circuit.

2. The control device of claim 1, wherein the switching circuitry comprises a random frequency generator including a system clock input and a nominal period input.

3. The control device of claim 1, wherein the switching circuitry alternately enables the measuring circuit and the driver circuit at a random frequency within a range of frequencies around a median frequency.

4. The control device of claim 3, wherein the random frequency is derived from a programmable register.

5. The control device of claim 4, wherein the programmable register comprises a linear feedback shift register.

6. The control device of claim 3, wherein the range of frequencies is within about 20 percent of the median frequency.

7. The control device of claim 3, wherein the range of frequencies is within about 30 percent of the median frequency.

8. The control device of claim 3, wherein the median frequency is between about 100 Hertz (Hz) and 5 kilohertz (kHz).

9. The control device of claim 1, and further comprising:
   a microcontroller for calculating the velocity of the movable member based on the average back EMF from the VCM and for controlling the magnitude of the drive current provided by the drive circuit based on the velocity of the movable member.

10. The control device of claim 1, wherein the control device is fabricated in an integrated circuit.

11. A method of controlling retraction of a transducing head from the surface of a recordable medium with reduced audible noise, the transducing head carried on a movable arm actuated by an electric motor, the method comprising:
   determining an average back electromotive force (back EMF) from the electric motor by measuring the back EMF a plurality of times and averaging the measured back EMF;
   driving the electric motor with a drive current having a magnitude based on the average back EMF from the electric motor; and
   aperiodically and alternately determining the average back EMF from the electric motor and driving the electric motor with a drive current.

12. The method of claim 11, wherein the aperiodic alternation is performed at a random frequency within a range of frequencies around a median frequency.

13. The method of claim 12, wherein the range of frequencies is within about 20 percent of the median frequency.

14. The method of claim 12, wherein the range of frequencies is within about 30 percent of the median frequency.

15. The method of claim 11, wherein aperiodically and alternately determining the average back EMF from the motor and driving the electric motor with a drive current comprises:
   producing a frequency offset;
   adjusting a median frequency by the frequency offset to produce a random frequency; and
   alternately determining the average back EMF from the electric motor and driving the electric motor with a drive current at the random frequency.

16. The method of claim 15, wherein producing the frequency offset comprises generating a random value derived from a programmable register.

17. The method of claim 16, wherein the random value is generated with a linear feedback shift register.

18. The method of claim 11, wherein driving the electric motor with a drive current having a magnitude based on the average back EMF comprises:
   calculating the velocity of the moveable arm based on the back EMF; and
   controlling the magnitude of the drive current provided by the drive circuit based on the velocity of the movable arm.

19. A circuit for controlling retraction of a device carried on a movable member actuated by an electric motor, the retraction system having reduced audible noise and comprising:
   a measuring circuit for determining an average back electromotive force (back EMF) from the electric motor by measuring the back EMF a plurality of times and averaging the measured back EMF;
   a driver circuit for providing the motor with a drive current having a magnitude based on the average back EMF from the motor; and
   switching means for aperiodically and alternately enabling the measuring circuit and the driving circuit.

20. The circuit of claim 19, wherein the switching means alternately enables the measuring circuit and the driver circuit at a random frequency within a range of frequencies around a median frequency.

21. The circuit of claim 20, wherein the range of frequencies is within about 20 percent of the median frequency.

22. The circuit of claim 20, wherein the range of frequencies is within about 30 percent of the median frequency.

23. The circuit of claim 20, wherein the random frequency is derived from a programmable register.

24. The circuit of claim 23, wherein the programmable register comprises a linear feedback shift register.

25. The circuit of claim 19, and further comprising:
a microcontroller for calculating the velocity of the movable member based on the average back EMF and for controlling the magnitude of the drive current provided by the drive circuit based on the velocity of the movable member.

* * * * *